United States Patent

Hermann et al.

Patent Number: 5,603,827
Date of Patent: Feb. 18, 1997

[54] MEMBRANE FILTER PLATE

[75] Inventors: Manfred P. Hermann; Heinz Bonn, both of Numberg, Germany

[73] Assignee: JV Kunststoffwerk GmbH, Georgensgmund, Germany

[21] Appl. No.: 432,972

[22] Filed: May 1, 1995

[30] Foreign Application Priority Data

Apr. 30, 1994 [DE] Germany .......... 44 15 274.4

[51] Int. Cl.$^6$ .......... B01D 25/00
[52] U.S. Cl. .......... 210/230; 210/231; 210/232; 210/450; 210/350; 210/451
[58] Field of Search .......... 210/224, 227, 210/232, 350, 359, 450, 451, 230, 231; 100/115, 211, 194

[56] References Cited

U.S. PATENT DOCUMENTS

| | | | |
|---|---|---|---|
| 3,888,769 | 6/1975 | Schotten et al. | 210/227 |
| 4,608,164 | 8/1986 | Neu | 210/231 |
| 4,741,826 | 5/1988 | Gevenich et al. | 210/228 |
| 4,746,428 | 5/1988 | Junker et al. | 210/230 |
| 4,746,429 | 5/1988 | Stanik | 210/231 |
| 4,749,482 | 6/1988 | Bonn | 210/231 |
| 4,826,593 | 2/1989 | Nev | 210/229 |
| 5,362,388 | 11/1994 | Bonn | 210/230 |
| 5,484,526 | 1/1996 | Bonn | 210/230 |

FOREIGN PATENT DOCUMENTS

| | | |
|---|---|---|
| 0208076 | 4/1986 | European Pat. Off. . |
| 0247288 | 2/1987 | European Pat. Off. . |
| 0383115A1 | 2/1990 | European Pat. Off. . |
| 2324876 | 5/1973 | Germany . |
| 3414550A1 | 4/1984 | Germany . |
| 3540786A1 | 11/1985 | Germany . |
| 4032937 | 10/1990 | Germany . |
| 4118620A1 | 6/1991 | Germany . |
| WO92/06760 | 4/1992 | WIPO . |

Primary Examiner—Ana Fortuna
Attorney, Agent, or Firm—Chilton, Alix & Van Kirk

[57] ABSTRACT

A filter element, for use in a plate filter press for example, includes a membrane supported from a plate and captured, about the periphery of an opening in the plate, by a clamping ring which locates a shaped edge bead on the membrane in a complementary shaped groove in the plate. The clamping ring has a bearing surface, which contacts a surface of the membrane edge bead which is oppositely disposed with respect to the portion thereof which cooperates with the groove in the plate, having an angle of inclination with respect to the plane of the plate which directs forces produced by pressure induced expansion of the membrane to the clamping ring in a generally radial direction with respect to the axis of the opening in the plate.

18 Claims, 4 Drawing Sheets

MEMBRANE FILTER PLATE

BACKGROUND OF THE INVENTION

1. Field of the Invention

The present invention relates to the art of filtration and, particularly, to improving the structural integrity of filter elements comprising membranes supported from a base plate. More specifically, this invention is directed to filter elements for use in press-type filters and, especially, to membrane filter plates having a base plate member which reliably engages and supports a membrane, particularly a flexible elastomeric membrane, about the periphery of an opening provided in the plate. Accordingly, the general objects of the present invention are to provide novel and improved methods and apparatus of such character.

2. Description of the Prior Art

While not limited thereto in its utility, the present invention is particularly well suited for use in multiple plate filters and, especially, in filter presses. Filter elements comprising a base plate which supports a membrane are known in the art. For a general discussion of membrane filter plates, reference may be had to U.S. Pat. No. 4,608,164. Such filter elements have a base plate provided with at least one opening, which is coaxial with openings in the other plates of the filter assembly, for defining a fluid feed channel. The membrane, which is typically associated with a filter cloth, engages the base plate about the periphery of the opening thereon the engagement being effected by means of a circumferential edge bead which is held in a groove provided about the plate opening. Retention of the membrane bead in the edge groove of the base plate has customarily been accomplished in the prior art by the use of a clamping ring.

The disengagement of the membrane edge bead from its receiving groove in the filter plate is a problem of long standing in the art. Such disengagement may occur because, during a pressing process, compressed air or some other suitable pressurized fluid will be introduced between the plate and the membrane and will force the resilient membrane away from the plate. Membrane disengagement about the periphery of a filter plate opening which in part defines the feed to a filter assembly has been a particular problem. In the prior art, this problem was sometimes addressed by affixing the membrane to the filter plate in the area of the edge bead through the use of an adhesive or by vulcanizing. These techniques, however, are not reliable because substantial shear forces may be generated due to membrane expansion during a pressing process and, in the region about the periphery of a feed opening, as opposed to the area about the outer edge of the filter plate, there is no structure to support the press membrane and resist such forces.

German Patent 23 24 876 discloses a filter element wherein the filter plate is provided with a circumferential groove which receives an edge bead provided on the membrane. The edge bead is retained in the circumferential groove by means of a slotted snap ring. The snap ring is, in turn, retained in place by means of a closed support ring. The technique for fastening a membrane to a filter base plate as disclosed in German Patent 23 24 876 has the disadvantage that it does not permit the use of very high press pressures. At attempt has been made to overcome this disadvantage by utilizing, instead of the support ring, a snap ring fastening comprising flanges which are bolted to "chamber" plates which are disposed between filter elements. Such flanges contact the snap ring so as to prevent axial movement thereof. The flanges also serve to position and support the filter element and to clamp in place a filter cloth which extends over the press membrane. The technique of using such flanges, however, has the disadvantage that it has very limited utility in the handling of aggressive media. Further, while a pressure load of up to three bar on the membrane is possible, there is an inherent danger that the membrane will be pulled from its anchoring in the presence of higher pressures.

German Patent Application 40 32 937 describes a membrane filter plate for plate filter presses wherein anchoring of the membrane in the area of an opening of a filter plate is achieved by forming the filter plate opening in a conical shape, providing the groove for receiving the edge bead of the membrane in the conical surface area and retaining the bead in the groove by means of a conically shaped clamping ring. In this technique, the outer surface of the clamping ring adjacent to the edge bead of the membrane is inclined away from the mid plane of the filter plate at an angle which is determined by the angle of the wall of the opening in the filter plate. When pressure is applied to the membrane to cause expansion thereof, the membrane will be pushed away from the filter plate in the axial direction, i.e., the membrane will be urged against the conical bearing surface of the clamping ring. In order to prevent the membrane from disengaging from the receiving groove of the filter plate, the clamping ring is secured in place by means of bolts which cooperate with a holding cross-piece portion of the filter plate. Accordingly, axial motion of the clamping ring is prevented and the edge bead of the membrane will be securely captured in the receiving groove. In order for this technique of ensuring against disengagement of the membrane from the filter plate to be successful, it is necessary to employ several mechanical fasteners distributed about the circumference of the clamping ring to retain the clamping ring in position. Since the liquids being treated are frequently highly corrosive, each of these mechanical fasteners must be sealed hermetically with respect to the feed channel of the filter assembly. This requirement for hermetic sealing increases both manufacturing and assembly costs.

SUMMARY OF THE INVENTION

The present invention overcomes the above-briefly discussed and other deficiencies and disadvantages of the prior art, and in so doing, provides a filter element, namely a filter plate and membrane subassembly, which is reliable while still being less expensive to manufacture and assemble than like elements in the prior art. An article in accordance with the invention is characterized by the provision, on a clamping ring which retains the edge bead of a membrane in a receiving groove about the periphery of an opening in a filter plate, of a bearing surface which is oriented either perpendicularly with respect to the midplane of the filter plate or is slightly inclined from such a perpendicular orientation. The employment of such a bearing surface, particularly when combined with a novel shape of the bead and cooperating receiving groove, prevents significant axial loading of the clamping ring in response to pressure induced expansion of the membrane. The aforementioned novel cooperating edge bead and receiving groove shapes result in the edge bead functioning as a wedge which will reliably move to cover any gap between the filter plate and membrane in response to membrane expansion. In the case of this wedging action, the forces which are produced will effectively act only radially on the clamping ring. Accordingly, expensive and/or complicated means for securing the clamping ring against axial motion, as had been required in the prior art, are unnecesary.

In accordance with the preferred embodiment of the present invention, the inclination of the bearing surface of the clamping ring will deviate from a perpendicular relationship by not more than ten degrees and, typically, by not more than five degrees.

Also in accordance with an embodiment of the invention, a circumferential projection is provided on the bearing surface of the clamping ring. This circumferential projection will engage a complementary recess provided in the edge bead portion of the membrane. The cooperating circumferential projection and recess also serves to ensure that the clamping ring will not move axially.

Pursuant to the invention, the membrane edge bead receiving groove in the filter plate will be formed so as to have a trapezoidal shape with the base of the groove being substantially parallel to the axis of the opening in the plate about which the groove extends. This trapezoidal shape, in combination with a complementary shape on the membrane edge bead, produces the above-described wedging action and reliably prevents the edge bead of the membrane from slipping out of the groove in the filter plate. Most importantly, the trapezoidal shape of the membrane edge bead, as a result of the wedging action, provides for a reliable seal even under conditions of very high press pressures.

The present invention may also employ a circumferential cross-piece which extends outwardly from the grooved edge of the filter plate toward the middle of the opening therein. When such a cross-piece is provided, the clamping ring may be fastened thereto by clamping or by mechanical fasteners.

The unique and important aspect of the present invention resides in the fact that the only forces of significant magnitude which will act on the clamping ring are radially directed. Accordingly, uncomplicated and expedited assembly of a filter element in accordance with the invention is possible.

Because of its unique design, and particularly the fact that only radial forces act thereon, a clamping ring in accordance with the invention may be in the form of a continuous tubular element. Further, since high strength structural elements which are susceptible to corrosion are not required for holding clamping rings or ring elements together, a clamping ring for use in the present invention may be fabricated from plastic. Thus, the steel elements and screw connections which have been previously been necessary to withstand the applied forces, and which have been susceptible to attack by aggressive media being filtered, can be eliminated.

BRIEF DESCRIPTION OF THE DRAWINGS

The present invention may be better understood, and its numerous objects and advantages will become apparent to those skilled in the art, by reference to the accompanying drawings wherein.

DESCRIPTION OF THE DISCLOSED EMBODIMENTS

Figure 1:
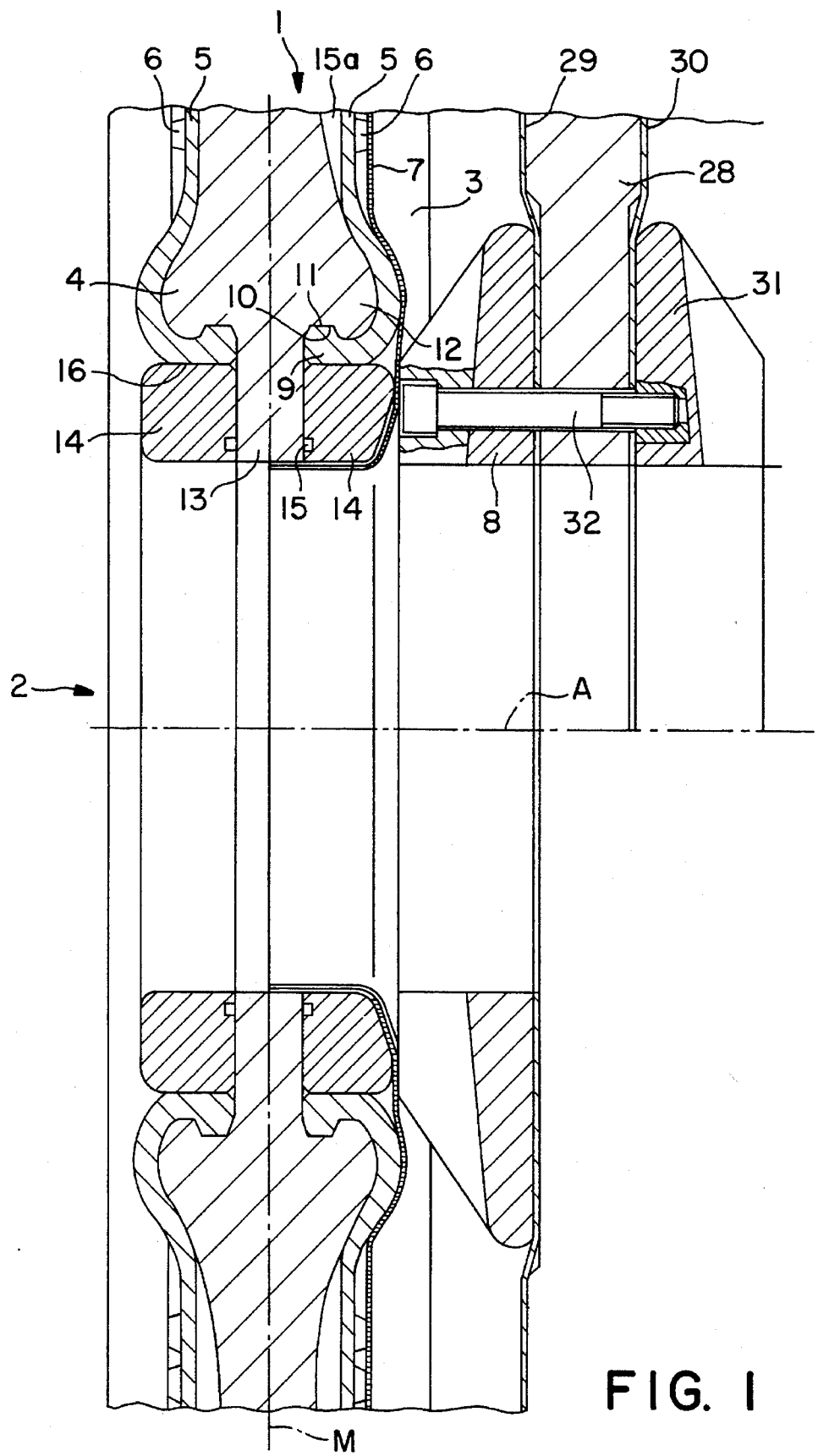
FIG. 1 is a partial, cross-sectional view of a filter element in accordance with a first embodiment of the invention, FIG. 1 also showing elements of an operating environment.

With reference to FIG. 1, a filter or base plate is indicated generally at 1. Plate 1 supports a membrane 5 which will hereinafter be referred to as a press membrane. Press membrane 5 is overlaid by a filter cloth 7. The combination of plate 1, press membrane 5 and filter cloth 7 defines a portion of a filter element which, in the typical use environment shown in part, will be stacked with other similar filter elements, adjacent filter elements being separated by chamber-defining plates or frames, to define a plate filter or filter press. The plates 1 are provided with apertures which, in the embodiment of FIG. 1, cooperate to define a central feed opening or channel 2, all of the filter plates being symmetric with respect to the axis A of opening 2. Restated, in the embodiment being described, the apertures in the stacked filter and chamber plates form a feed channel. The material to be filtered will flow from the feed channel 2 into individual feed chambers 3 which are disposed between filter plate assemblies of the stack.

Plate 1 has a main body portion 4 which terminates, in the region which defines the opening 2 in a "holding cross-piece" 13. The cross-piece 13 is thus in the form of an annular projection which extends into opening 2. The thickness of cross-piece 13 is substantially less than that of the main portion of body 4. In the region at the junction of the cross-piece 13 and main body 4, filter plate 1 is provided with a rounded guide area 12 of the increased thickness. A press membrane 5 is provided on each side of plate 1 as shown. The press membranes 5 have a number of knobs or projections 6 on the side thereof which faces filter chamber 3. The filter cloth 7 is supported on the knobs 6 and is thus spaced from membrane 5. In FIG. 1 the filter cloth 7 is shown only on one side of the filter assembly. The filter cloth 7 is clamped, in the manner to be described below, where it passes over a flange 8. It will be understood, however, that the present invention may be practiced using other techniques for holding the filter cloths in position. The press membrane 5 and filter cloth 7 are fastened at the outer periphery of the filter plate 1, which is not shown in the drawing, in the conventional manner. The press membrane 5 is formed so as to have, and filter cloth 7 will be shaped to have, an opening which is coaxial with the feed channel defining aperture in filter plate 1.

The press membrane 5 is provided, at the edge of the opening therein, with an edge bead 9. Bead 9 is complementary in shape to a groove 10 provided in body 4 of filter plate 1, the groove 10 being in part defined by the projecting cross-piece 13 in the FIG. 1 embodiment. In accordance with the preferred embodiment of the invention, each of the grooves 10 has a trapezoidal shape. The base 11 of each groove 10 is oriented so as to be substantially parallel to the axis A of the feed channel 2. The press membrane 5 extends, from the edge bead 9, around the guide area 12 of main body 4 and outwardly to the edge area, not shown, of plate 1. In the region disposed outwardly from the rounded guide area 12, a space 15a is provided between membrane 5 and body 4 of plate 1. In the manner known the art, the space 15a may communicate with a drain or a source of pressurized fluid. For example, compressed air may be delivered to space 15a to cause the membrane 5 to expand outwardly into chamber 3 to press liquid from a "cake" disposed therein.

The projecting cross-piece 13 of plate 1, as noted above, in part forms a side of each of the press membrane bead receiving grooves 10, i.e., the cross-piece 13 separates the grooves from one another. A clamping ring(s) 14, which retains the edge beads 9 of the press membrane 5 in the grooves 10, is received on the cross-piece 13 as shown. The unique design of a filter plate in accordance with the present invention permits clamp ring 14 to be fabricated from plastic, polypropylene for example. Ring 14 may be fastened to cross-piece 13 by means of a clamp, not shown. Clamping ring 14 may also be sealed to cross-piece 13, thereby preventing leakage of fluid from the channel 2 between the clamp ring and cross-piece, by means of an O-ring seal 15.

The membrane 5 must be sealed to plate 1. This sealing may be easily accomplished in the outer edge area of the filter plate by means known in the art. However, even with the use of seal 15, the sealing is more problematic in the area of the opening 2. Thus, in the area of opening 2, sealing must be ensured both in the case of filtration pressure, i.e., a pressure applied in the filter chamber 3 which results in an unstressed or unexpanded membrane 5, as well as in the case of "pressing" pressure, i.e., pressure applied in space 15a which will cause the press membrane 5 to expand. It is, of course, essential that the sealing of the membrane 5 to plate 1 about the feed opening be accomplished in such a manner as to ensure that the edge bead 9 of membrane 5 will not become disengaged from groove 10 in response to pressure induced expansion of membrane 5.

In the case of filtration pressure, the requisite sealing is achieved by holding the edge bead 9 in groove 10 by means of clamping ring 14. However, when press membrane 5 is expanded by a pressure differential operating in the opposite direction, bead 9 must be prevented from the slipping out of groove 10. Because of the complementary shape of the bead 9 and groove 10, the bead 9 will, when caused to move as a result of membrane expansion, function as a wedge which moves in the direction of the gap between the clamping ring 14 and the guide area 12 of plate 1 main body 4. Accordingly, as the pressure which causes expansion of membrane 5 increases, the sealing force will similarly increase thus ensuring a reliable seal. Also, because of the above-described wedging action, the forces applied by the membrane to clamping ring 14 will be concentrated in the radial direction, i.e. will effectively be directed toward axis A. The clamping ring 14, because of its shape, is inherently stable, i.e., the clamping ring is able to resist radially applied forces. Axial forces, which would tend to push the clamping ring 14 away from the cross-piece 13, either do not occur or have only a very limited effect in accordance with the design of the present invention. Thus, the present invention allows the clamping ring 14 to be fastened on the cross-piece 13 without expensive or labor intensive fastening facilities or techniques, i.e., by means of an uncomplicated clamp for example.

In the embodiment of FIG. 1, the above-mentioned clamp for positioning the clamping ring 14 consists of the previously mentioned flange 8. Flange 8 and a similar, oppositely facing flange 31 are bolted together by means of a plurality of bolts 32 which pass through chamber plate 28, the bolts 32 being circumferentially spaced. Filter cloths 29 and 30 are, respectively, captured between flanges 8 and 31 and plate 28. Plate 1 is held in position in the filter simply by disposing a chamber plate with flange 8 next to it without any further mechanical coupling. In a conventional membrane filter arrangement a plurality of filter elements, i.e., plates 1 with membranes 5, and chamber plates 28 with attached flanges are disposed serially next to each other.

In the embodiment of FIG. 1, the bearing surface 16 of clamping ring 14, i.e., the side of the clamping ring which is in contact with the membrane 5, is oriented substantially perpendicular to the midplane M of filter plate 1. This arrangement ensures that, in the case of expansion thereof, the membrane 5 which is stretched over the guide area 12 of plate 1 will exert force against clamping ring 14 only in the radial direction.

In summary, the present invention reliably prevents the edge bead 9 from slipping out of the groove 10 and thus achieves sealing between membrane 5 and the body 4 of filter plate 1 even in the presence of a high pressing pressure.

Figure 2:
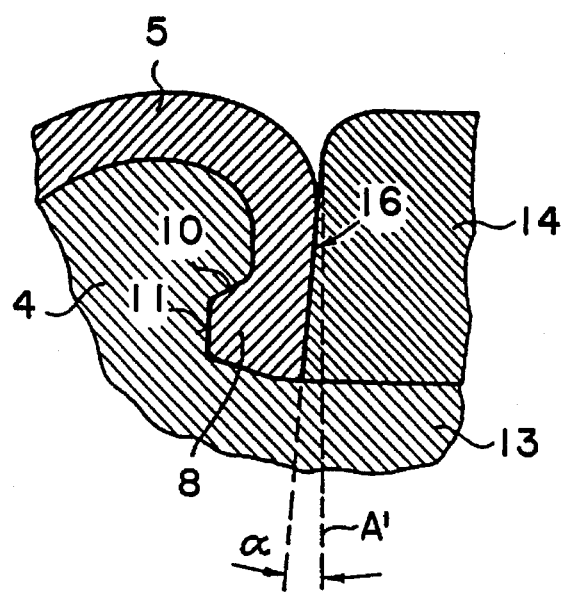
FIG. 2 is an enlarged view of a portion of a filter element of the type shown in FIG. 1, FIG. 2 depicting a second embodiment of the invention.

Referring to FIG. 2, the bearing surface 16 of clamping ring 14 is provided with a slightly acute-angled inclination with respect to a line perpendicular to the midplane M of plate 1, i.e., the edge of surface 16 which abutts cross-piece 13 is located further from the axis A of feed channel 2 than is the opposite edge of surface 16. This angle of inclination α of bearing surface 16 with respect to axis A should not exceed 10° and, in order to ensure sealing, may be as small as 4°. In FIG. 2 a line which is parallel to axis A, and thus transverse to midplane M, has been indicated as A' to facilitate understanding of the embodiment. Also in the FIG. 2 embodiment, the guide area 12 on the plate 1 may be provided with an inclination which matches that of bearing surface 16 of clamping ring 14. This inclining of the surface of guide area 12 which contacts the membrane 5 will ensure a more gentle transmission of force via the flexible membrane material thereby reducing the danger of tearing of the membrane.

Figure 3:
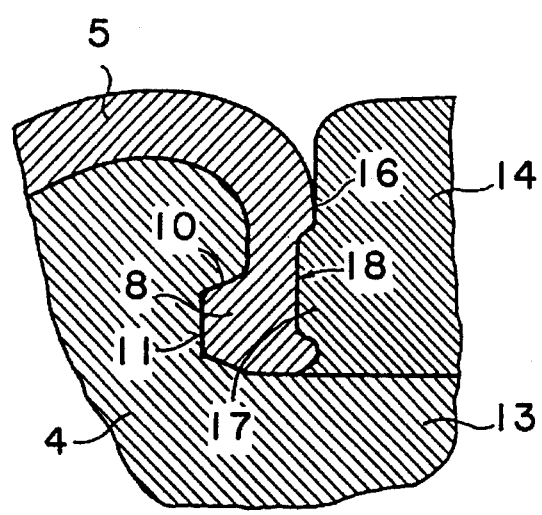
FIG. 3 is a view similar to FIG. 2 depicting a third embodiment of the invention.

In accordance with a further embodiment of the invention, as depicted in FIG. 3, the bearing surface 16 on clamping ring 14 is provided with a circumferential projection 17. This projection 17 will engage a complementary shaped recess 18 in the facing side of the edge 9 of membrane 5. The cooperation between the projection 17 and recess 18 will serve to secure clamping ring 14 against axial movement and thereby, at least in some applications, eliminate the need of additional means for fastening the clamping ring in the position shown.

Figure 4:
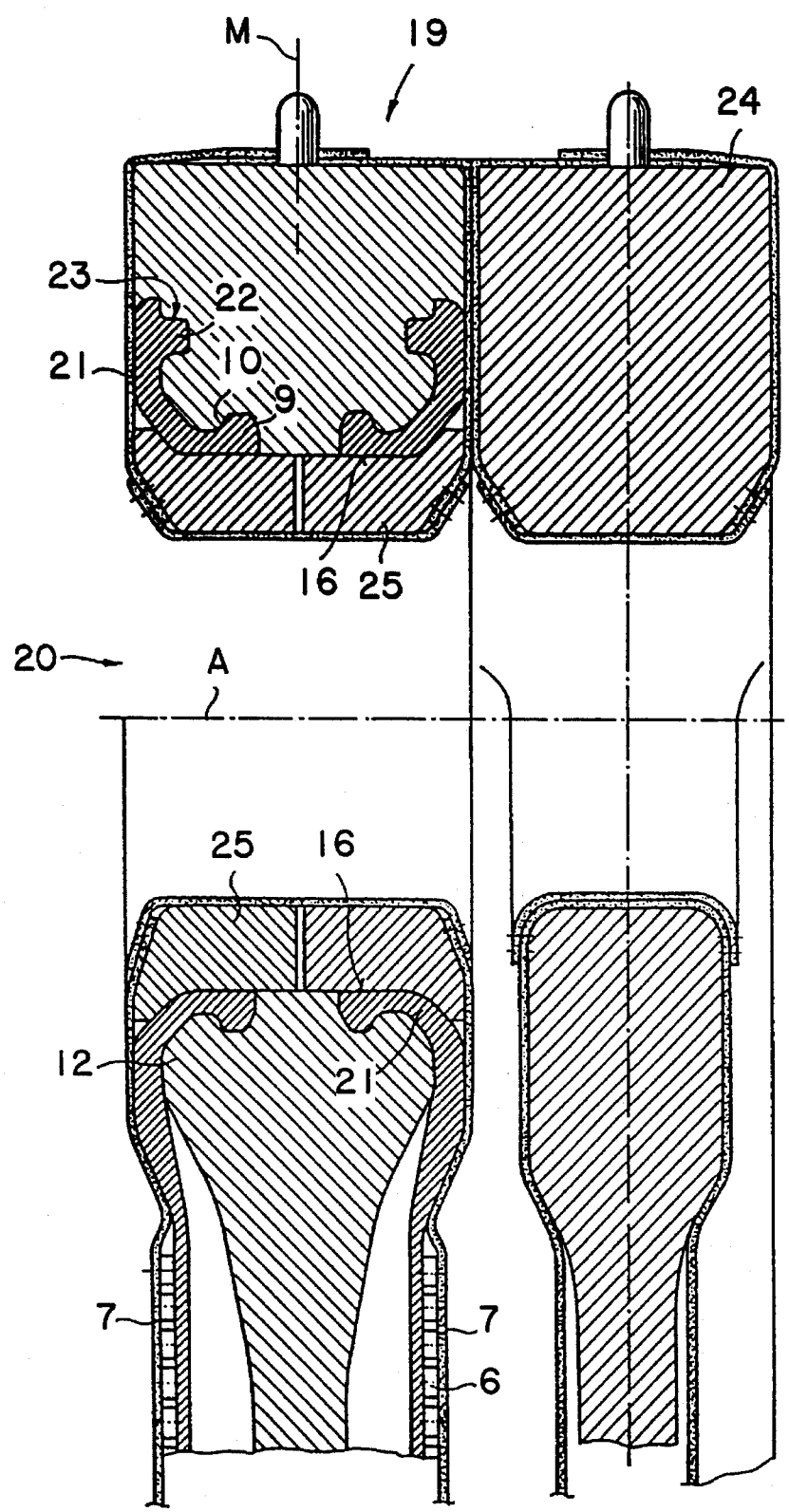
FIG. 4 is a partial sectional view through a further membrane filter taken in the area of the feed opening thereof.

FIG. 4 shows a filter element wherein the feed opening, indicated at 20, is provided in an edge area of a membrane filter plate, indicated generally at 19, rather than in the middle thereof as described above with respect to FIG. 1. In the FIG. 4 arrangement, a press membrane 21 is retained, by means of an edge bead 22, in a groove 23 provided in the plate. The membrane 21 is additionally supported by a chamber defining plate 24. The clamping action of plate 24 ensures that bead 22 cannot disenage from groove 23. Plate 24 also holds, against axial motion, a two-part clamping ring 25. Accordingly, additional means for holding the clamping ring 25, such as the cross-piece 13 of the FIG. 1 embodiment, is not necessary. It will be understood that an arrangement of the type depicted in FIG. 4 could be employed to capture the clamping rings 14 of the embodiments of FIGS. 1–3 against axial movement. However, since no significant axial forces will act on either the clamping ring 14 of FIGS. 1–3 or clamping ring 25 of the embodiment of FIG. 4, it is also possible to eliminate additional fastening for the clamping ring.

To summarize the above, the effective elimination of axial forces on the clamping rings of the disclosed embodiments of the invention during expansion of the membrane allows a less complicated filter element structure and thus accelerates assembly of the filter elements. At the same time, the sealing of the membranes to the filter plate is ensured even in the case of a high pressing pressure.

Figure 5:
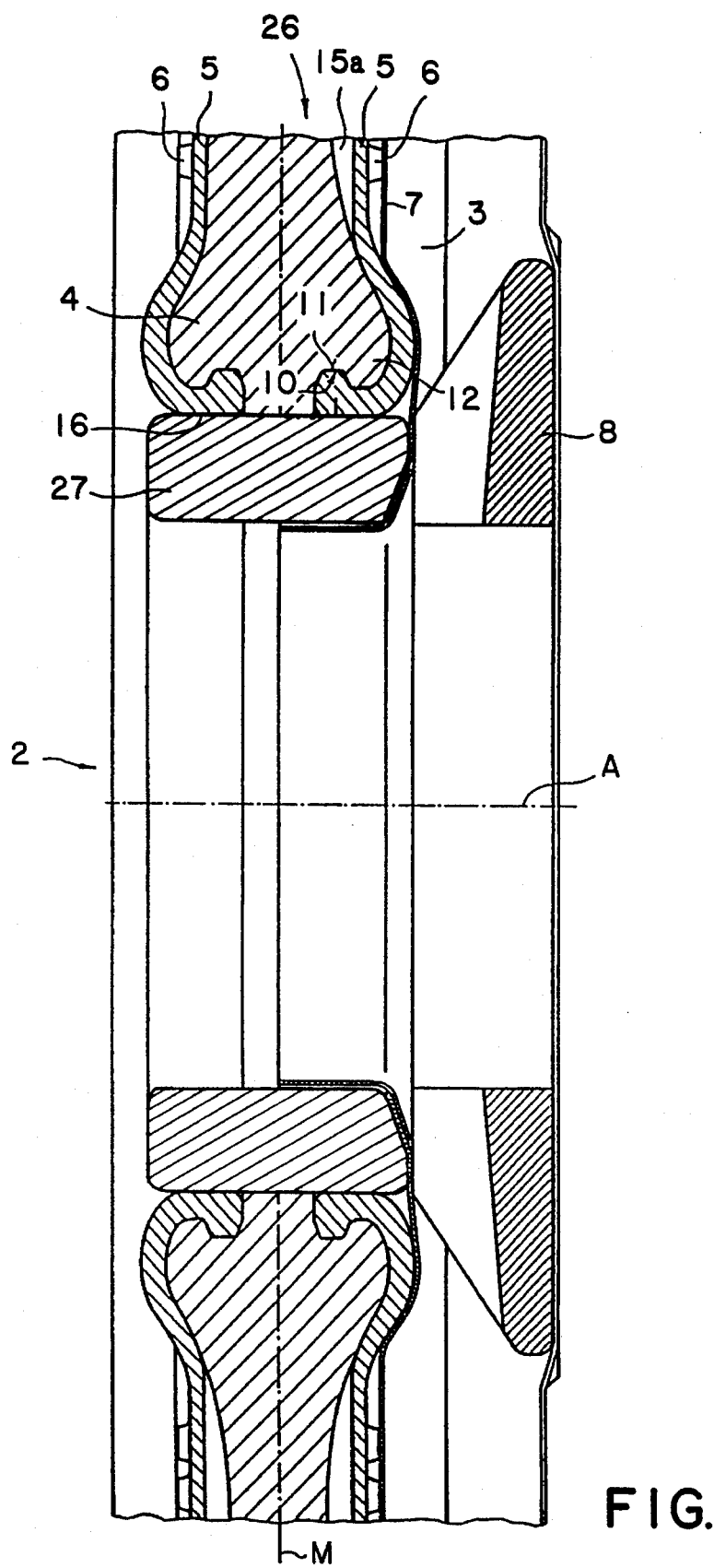
FIG. 5 is a view similar to FIG. 1 showing a fifth embodiment of the invention.

The assembly of a membrane filter plate in accordance with the invention is further simplified by the embodiment of FIG. 5. In the FIG. 5 embodiment the plate, indicated generally at 26, does not have a cross-piece to which the clamping ring 27 is secured. Rather, the clamping ring 27 is constructed as a continuous steel or polypropylene tube. Thus, no screw connection of two clamping rings or clamping ring segments is required. By eliminating a mechanical fastening to the plate body, the elements which are most subject to corrosion are also eliminated. Since the design of the membrane and plate body, as described above, substantially eliminates axial forces which would otherwise act on the clamping ring 27, additional means for securing the clamping ring against movement in the axial direction is not required, i.e., proper positioning will be maintained by the frictional engagement of the clamping ring with the membrane.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A filter element comprising:

a rigid base plate, said plate defining a midplane and having a pair of oppositely disposed side surfaces, said plate having at least a first aperture therethrough, said aperture being defined by an edge region of said plate which extends between said side surfaces, said aperture having an axis which is substantially perpendicular to said midplane, said plate edge region including at least a first groove which generally opens in the direction of said axis;

at least a first flexible membrane, said membrane having an opening extending therethrough, said opening being coaxial with said aperture in said plate, a first portion of said membrane which extends about said opening being provided with a thickened bead area, said bead area at least in part being complementary in shape to said first groove, said complementary shaped bead area part being disposed in said first groove, a space being defined between at least another portion of said membrane and a side surface of said plate;

a filter cloth, said filter cloth being disposed at a side of said membrane which faces away from said plate side surface, said filter cloth being provided with an opening which is coaxial with said plate aperture; and clamping ring means for engaging said membrane first portion and retaining said complementary shaped membrane bead area part in said first groove, said clamping ring means having a bearing surface which contacts a surface of said membrane, said bearing surface having an angle of inclination with respect to a line perpendicular to said midplane which results in the point of contact between said bearing surface and said membrane which is spaced the furthest from said midplane coinciding with the point of closest approach of said bearing surface to said axis, said angle of inclination not exceeding ten degrees whereby the majority of the forces produced by pressure induced distortion of said membrane another portion will be transmitted to said clamping ring means in directions which are generally radial to said aperture axis.

2. The filter element of claim 1 wherein said bearing surface is provided with a projection and said membrane bead area is provided with a recess having a complementary shape to said projection.

3. The filter element of claim 2 wherein said first groove in said plate edge region has a trapezoidal shape, and wherein said groove has a base which is oriented substantially parallel to said axis of said aperture.

4. The filter element of claim 3 wherein said clamping ring means comprises at least a first clamping ring and wherein said filter element further comprises means for fastening sad clamping ring to said plate.

5. The filter element of claim 4 wherein said clamping ring means comprises a continuous tube.

6. The filter element of claim 5 wherein said continuous tube is comprised of plastic material.

7. The filter element of claim 4 wherein said clamping ring means comprises a clamping ring comprised of plastic material.

8. The filter element of claim 2 wherein said clamping ring means comprises at least a first clamping ring and wherein said filter element further comprises means for fastening said clamping ring to said plate.

9. The filter element of claim 1 wherein said first groove in said plate edge region has a trapezoidal shape, and wherein said groove has a base which is oriented substantially parallel to said axis of said aperture.

10. The filter element of claim 1 wherein said plate further comprises a cross-piece which projects from said plate edge region toward said axis, said cross-piece comprising an extension of a first side of said first groove, said cross-piece extending about said aperture, said clamping ring means engaging said cross-piece.

11. The filter element of claim 1 wherein said clamping ring means comprises a continuous tube.

12. The filter element of claim 1 wherein said clamping ring means comprises a clamping ring comprised of plastic material.

13. The filter element of claim 1 wherein said clamping ring means comprises at least a first clamping ring and wherein said filter element further comprises means for fastening said clamping ring to said plate.

14. A filter element comprising:

a rigid base plate, said plate defining a midplane and having a pair of oppositely disposed side surfaces, said plate having at least a first aperture therethrough, said aperture being defined by an edge region of said plate which extends between said side surfaces, said aperture having an axis which is substantially perpendicular to said midplane, said plate edge region including at least a first groove which generally opens in the direction of said axis;

at least a first flexible membrane, said membrane having an opening extending therethrough, said opening being coaxial with said aperture in said plate, a first portion of said membrane which extends about said opening being provided with a thickened bead area, said bead area at least in part being complementary in shape to said first groove, said complementary shaped bead area part being disposed in said first groove, a recess which generally opens in the direction of said axis being provided in said membrane bead area, a space being defined between at least another portion of said membrane and a side surface of said plate;

a filter cloth, said filter cloth being disposed at a side of said membrane which faces away from said plate side surface, said filter cloth being provided with an opening which is coaxial with said plate aperture; and clamping ring means for engaging said membrane first portion and retaining said complementary shaped membrane bead area part in said first groove, said clamping ring means having a bearing surface which contacts a surface of said membrane, said bearing surface being provided with a projection which is complementary in shape to said recess in said membrane bead area, said bearing surface also having an average angle of inclination with respect to a line perpendicular to said midplane which results in the majority of the forces produced by pressure induced distortion of said membrane another portion being transmitted to said clamping ring means in directions which are generally radial to said aperture axis.

15. The filter element of claim 14 wherein said first groove in said plate edge region has a trapezoidal shape, and wherein said groove has a base which is oriented substantially parallel to said axis of said aperture.

16. The filter element of claim 15 wherein said clamping ring means comprises at least a first clamping ring and wherein said filter element further comprises means for fastening said clamping ring to said plate.

17. The filter element of claim 14 wherein said first groove in said plate edge region has a trapezoidal shape, and wherein said groove has a base which is oriented substantially parallel to said axis of said aperture.

18. The filter element of claim 14 wherein said clamping ring means compresses at least a first clamping ring and wherein said filter element further comprises means for fastening said clamping ring to said plate.

* * * * *